United States Patent
Holmgren et al.

(10) Patent No.: US 7,888,620 B2
(45) Date of Patent: Feb. 15, 2011

(54) REDUCING COHERENT CROSSTALK IN DUAL-BEAM LASER PROCESSING SYSTEM

(75) Inventors: Douglas Earl Holmgren, Portland, OR (US); Ho Wai Lo, Portland, OR (US); Philip Mitchell Conklin, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1060 days.

(21) Appl. No.: 11/496,871

(22) Filed: Jul. 31, 2006

(65) Prior Publication Data

US 2008/0023447 A1    Jan. 31, 2008

(51) Int. Cl.
*B23K 26/00* (2006.01)
*G01B 11/02* (2006.01)

(52) U.S. Cl. .................... 219/121.6; 356/508
(58) Field of Classification Search ............. 219/121.6; 356/508; *B23K 26/06, 26/067*
See application file for complete search history.

(56) References Cited

U.S. PATENT DOCUMENTS

| | | | |
|---|---|---|---|
| 4,786,126 A * | 11/1988 | Kramer | .................. 359/18 |
| 5,097,351 A | 3/1992 | Kramer | |
| 5,715,337 A | 2/1998 | Spitzer et al. | |
| 6,680,797 B2 | 1/2004 | Juday | |
| 6,694,075 B1 | 2/2004 | Bhatia et al. | |
| 6,912,054 B2 * | 6/2005 | Hill | ............................ 356/500 |

OTHER PUBLICATIONS

International Searching Authority (KIPO), Written Opinion, International Patent Application No. PCT/US2007/074506, dated Dec. 28, 2007, 4 pages.

* cited by examiner

*Primary Examiner*—Tu B Hoang
*Assistant Examiner*—Ket D Dang
(74) *Attorney, Agent, or Firm*—Stoel Rives LLP

(57) ABSTRACT

A method of and system for forming two laser processing beams with controlled stability at a target specimen work surface includes first and second mutually coherent laser beams propagating along separate first and second beam paths that are combined to perform an optical property adjustment. The combined laser beams are separated into third and fourth laser beams propagating along separate beam paths and including respective third and fourth main beam components, and one of the third and fourth laser beams contributes a leakage component that copropagates in mutual temporal coherence with the main beam component of the other of the third and fourth laser beams. An effect of mutual temporal coherence of the leakage component and the other main beam component with which the leakage component copropagates is reduced through acousto-optic modulation frequency shifts or through incorporation of an optical path length difference in the two beams.

17 Claims, 5 Drawing Sheets

REDUCING COHERENT CROSSTALK IN DUAL-BEAM LASER PROCESSING SYSTEM

TECHNICAL FIELD

The present disclosure relates generally to systems for and methods of reducing crosstalk in dual-beam, laser processing systems and, more specifically, to reducing coherent crosstalk present in such systems.

BACKGROUND INFORMATION

A dual-beam laser processing system that uses polarized beams derived from a single laser to produce two target specimen processing beams can undergo coherent crosstalk stemming from a significant portion of one beam leaking into the propagation path of the other beam. Coherent crosstalk arises when the two beams derived from the single laser are purposefully combined in a common beam path through a portion of the optical train and are subsequently reseparated. Because of the coherent nature of the two beams, any leakage of one beam into the propagation path of the other beam at the reseparation stage leads to coherent crosstalk, which is substantially more severe than that which would be present if the beams were mutually incoherent. Coherent crosstalk causes degraded pulse energy and power stability control of one or both of the laser beams at the working surface of the target specimen.

SUMMARY OF THE DISCLOSURE

Embodiments of dual-beam laser processing systems implement techniques for reducing crosstalk between two laser processing beams to provide them with controlled stability at a work surface of a target specimen. Such systems each include a laser emitting a beam of light that is divided into first and second mutually coherent laser beams propagating along separate first and second beam paths. The first and second mutually coherent laser beams are purposefully combined in a common beam path portion of an optical component train to perform an optical property adjustment that is common to the first and second laser beams. The first and second previously combined laser beams are separated into third and fourth laser beams that propagate along respective third and fourth beam paths. The third and fourth laser beams include respective third and fourth main beam components, and one of the third and fourth laser beams contributes a leakage component that copropagates in mutual temporal coherence with the main beam component of the other of the third and fourth laser beams. Several embodiments implement techniques for reducing an effect of the mutual temporal coherence of the leakage component and the other of the third and fourth main beam components with which the leakage component copropagates to deliver to the workpiece stabilized first and second processing beams corresponding to the third and fourth beams.

Two embodiments entail passing one of the first and second mutually coherent laser beams through an optical path-length adjuster to reduce mutual coherence of the first and second laser beams by introducing an optical path-length difference between the first and second laser beams. The optical path-length difference is introduced by insertion of an air path or an optical glass component in the beam path of one of the first and second laser beams before their recombination. The path length difference is set to be greater than the coherence length of the laser but not so long as to cause unacceptable differences in beam propagation.

A third embodiment entails passing the first and second laser beams through respective first and second acousto-optic modulators. At least one of the first and second acousto-optic modulators is adjusted to impart to the first and second laser beams, and thereby to the leakage component, a change in a difference frequency, $\Delta\omega$, that reduces the effect of the mutual coherence of the leakage component and the other of the third and fourth main beam components on the stability of the first and second processing beams.

Additional aspects and advantages will be apparent from the following detailed description of various preferred embodiments, which proceeds with reference to the accompanying drawings.

DETAILED DESCRIPTION OF PREFERRED EMBODIMENTS

The embodiments of the present disclosure will be best understood by reference to the drawings, wherein like parts are designated by like numerals throughout. It will be readily understood that the components of the present disclosure, as generally described and illustrated in the figures herein, could be arranged and designed in a wide variety of different configurations. Thus, the following more detailed description of the embodiments of the apparatus, system, and method of the present disclosure is not intended to limit the scope of the disclosure, but is merely representative of the various embodiments of the present disclosure.

Figure 1:
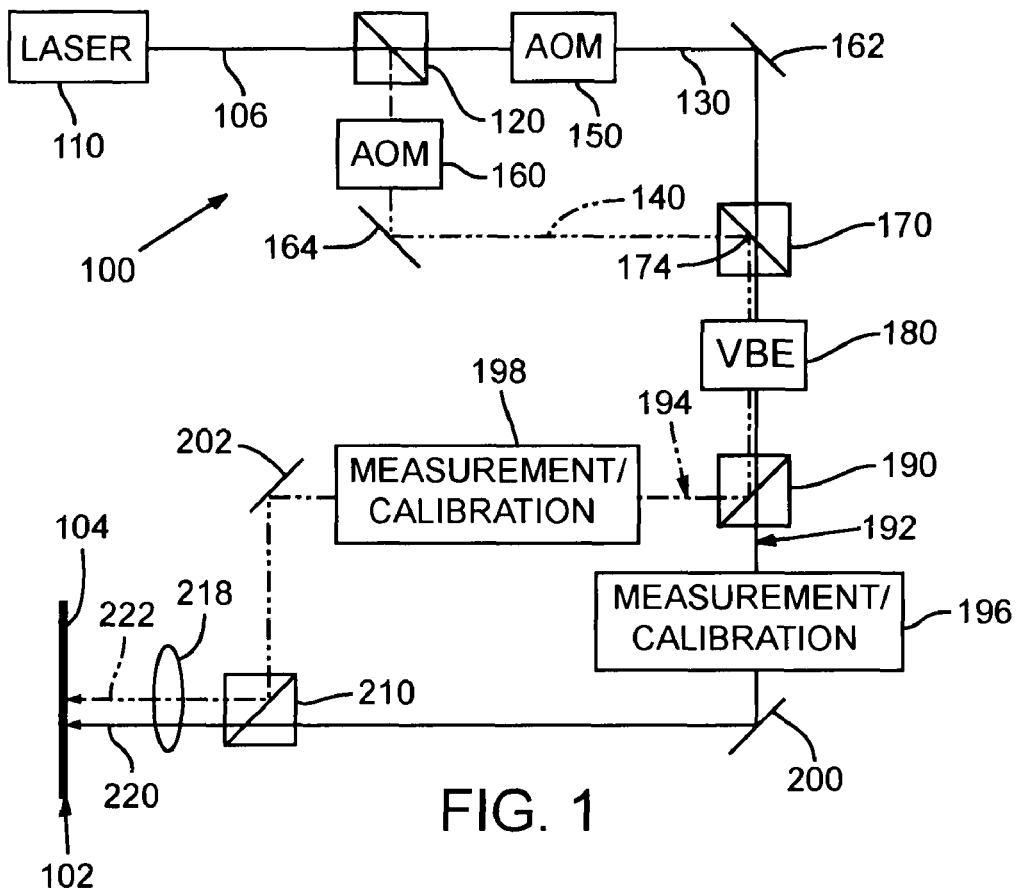
FIG. 1 is a diagrammatic depiction of an embodiment of a dual-beam laser processing system.

FIG. 1 is a diagrammatic depiction of an embodiment of a dual-beam processing system 100, which creates two laser beams for processing a target specimen or a workpiece 102 (such as a semiconductor wafer, a microchip, or the like) at a work surface 104. A (preferably pulsed) laser beam 106 emitted by a single laser 110 is incident on a first polarizing beam splitter cube (PBSC) 120, from which propagate a first laser beam 130 and a second laser beam 140. Nominally, one of the beams 130 and 140 is linearly polarized with its electric field vector in the plane of FIG. 1 (P-pol), and the other of the beams 130 and 140 is linearly polarized with its electric field vector normal to the plane of FIG. 1 (S-pol). Thus, beams 130 and 140 are nominally orthogonally polarized relative to each other.

First and second beams 130 and 140 are modulated by respective acousto-optic modulators (AOMs) 150 and 160 acting as adjustable light shutters that control the intensity of light passing through them. Laser beams 130 and 140 reflect off respective turning mirrors 162 and 164 and strike a second PBSC 170. PBSC 170 recombines laser beams 130 and 140 at an internal beam overlap location 174 and directs them as a combined beam propagating along a beam path for incidence on a variable beam expander (VBE) 180. VBE 180 performs a beam size adjustment that is common to both beams 130 and 140, and thereafter directs them to a third PBSC 190 for separation. The separated beams propagate from third PBSC 190 as a third beam 192 and a fourth beam 194 along separate beam paths.

Third beam 192 and fourth beam 194 propagate through respective power measurement/calibration subsystems 196 and 198 that are characterized by frequency passbands and provide measured beam intensity information that is useful for specimen processing. Measured beams 192 and 194 reflect off respective mirrors 200 and 202 for incidence on and combination by a fourth PBSC 210. The combined output beams of fourth PBSC 210 propagate through an objective lens 218 that forms a first processing beam 220 and a second processing beam 222 for incidence on a work surface 104 of a target specimen 102. The eventual position, focus height, and size of each beam 192 and 194 are adjusted to provide their corresponding processing beams 220 and 222 with the desired properties at work surface 104 of target specimen 102. It is normally desirable to have equal optical path lengths for beams 130 and 140 to substantially closely match beam propagation effects on the spot size and focus height of each processing beam at work surface 104. However, as will be shown, substantially equal optical path lengths increase mutual crosstalk interference.

Figure 2:
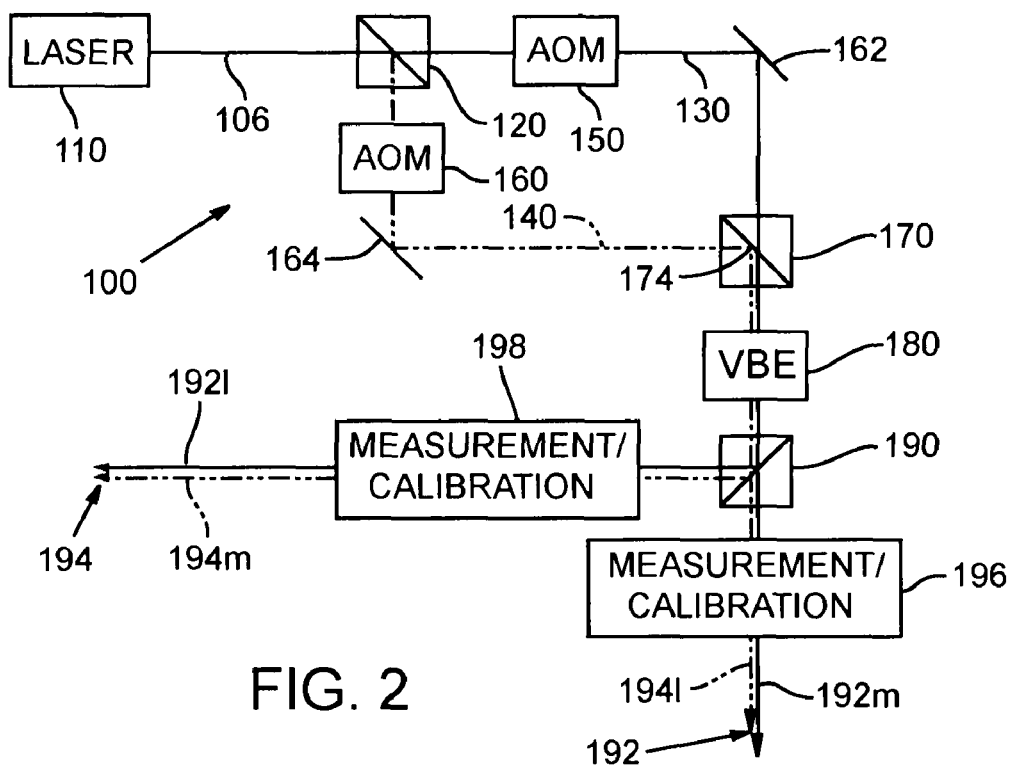
FIG. 2 displays the dual-beam laser processing system of FIG. 1 showing beam leakage from one main beam to the other main beam.

FIG. 2 shows dual-beam processing system 100 of FIG. 1 with beam leakage appearing after third PBSC 190. Beam crosstalk occurs at PBSC 190 when a portion of third beam 192 leaks into the path of fourth beam 194, a portion of fourth beam 194 leaks into the path of third beam 192, or both. FIG. 2 shows third beam 192 composed of a main beam component 192m and a leakage beam component 194l leaked from fourth beam 194, and fourth beam 194 composed of a main beam component 194m and a leakage beam component 192l leaked from third beam 192. This leakage occurs because of the practical limits of polarized beam splitter performance, from imperfect linear polarization of beams 130 and 140, and from imperfect alignment of beam splitter and beam combiner polarization axes. Downstream from PBSC 190, the leakage beam component (194l or 192l) is indistinguishable from the main beam component (192 or 194) in a given beam path. Because the leakage beam component is temporally coherent with the main beam component in each beam path downstream of PBSC 190, coherent addition between the main and leakage beam components occurs. Such coherent addition of the main and leakage beam components leads to significant variation in the total beam intensity, I. The mutual temporal coherence of the main and leakage beam components is at a maximum when the path lengths for first and second beams 130 and 140 are equal.

Figure 3:
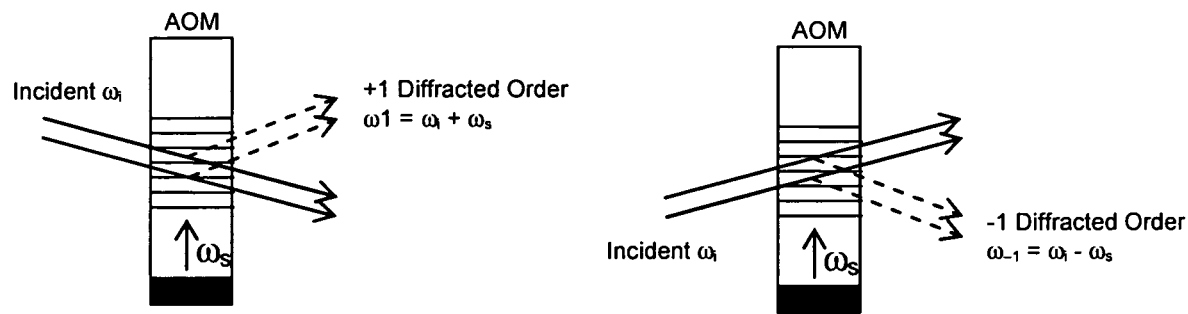
FIG. 3 is a diagrammatic depiction of an embodiment of frequency shifts occurring in an acousto-optic modulator.

FIG. 3 is a diagrammatic depiction of frequency shifts occurring in either of AOMs 150 and 160. Use of the frequency and phase shifting properties of AOMs 150 and 160 enables configuration of system 100 so that the frequency of the beam intensity variation resulting from coherent crosstalk (beam leakage) is shifted to a frequency that is outside one or both of the passbands of power measurement/calibration subsystems 196 and 198 and laser processing effects.

One of several AOM configurations that effect one or both of such a frequency and phase shift may include: (1) quasi-static operation in which the coherent crosstalk level varies slowly, with optional phase adjustment in which the coherent crosstalk level is minimized by adjusting the relative phase of beams 130 and 140; (2) frequency modulation by using for each beam a different AOM RF drive frequency, in which the coherent crosstalk (or leakage) frequency is made equal to the difference between the two AOM RF frequencies; and (3) frequency modulation by using different AOM diffractive orders for beams 130 and 140. Each case is further discussed below.

When two beams of intensities $I_1$ and $I_2$ overlap, the resultant total intensity I includes, in addition to the simple sum ($I_1+I_2$), a coherent addition or interference term $$I_{ac}=2E_1 \cdot E_2 \cos(\Delta\omega t+\phi),$$

where $E_1$ and $E_2$ are the electric field amplitude vectors for the beam, $\Delta\omega$ is the difference in the frequencies of beams 130 and 140, and $\phi$ is a phase term, which arises from any static phase difference between the two beams 130 and 140, path-length differences, and possibly coherence properties of the beams. The term $\Delta\omega$ is also the frequency of the coherent crosstalk. Because of the vector dot product of the electric fields $E_1$ and $E_2$, only the polarization component common to both beams 130 and 140 contributes to the crosstalk term $I_{ac}$. To the extent that the crosstalk term $I_{ac}$ cannot be eliminated through use of orthogonal polarizations, its effect on coherent crosstalk may be reduced by purposefully using properties of acousto-optic time modulation of light to set the difference frequency $\Delta\omega$ and phase $\phi$ to advantageous values. The coherent term $I_{ac}$ may represent a significant leakage term in the overall beam intensity I. For example, if $I_1$ is the desired main signal intensity, and $I_2$ is an undesired leakage signal of the same polarization, the total intensity can be written as $$I = I_1\left(1 + \frac{I_2}{I_1} + 2\sqrt{\frac{I_2}{I_1}}\cos(\Delta\omega t + \phi)\right).$$

If, for instance, $I_2$ is 1% of $I_1$, then the coherent addition term $I_{ac}$ may be as large as 20% of $I_1$.

It is known that a light beam of frequency $\omega_i$ that is diffracted by the sound field present in an AOM is shifted to a new frequency $\omega_n$:

$$\omega_n=\omega_i+n\omega_{s1},$$

where $\omega_{s1}$ is the AOM sound field frequency and n is an integer representing the diffraction order of the AOM being used (n is typically +1 or −1 as shown in FIG. 3, although +2, −2, and even higher orders are possible). The diffractive order is determined by alignment of the beam to the AOM sound field velocity vector 107 $_s$. These concepts are illustrated in FIG. 3. Typically, $\omega_{s1}$ is on order of $2\pi*(10^7$ to $10^8)$ radians/s. Because the diffraction order and sound field frequency can be independently controlled for each of AOMs 150 and 160, the frequency difference term $\Delta\omega$ above becomes $$\Delta\omega=(\omega_i+n\omega_{s1})-(\omega_i+m\omega_{s2})=n\omega_{s1}-m\omega_{s2},$$

where $\omega_{s1}$ and $\omega_{s2}$ are the individual AOM sound frequencies, and n and m are the diffraction orders for beams 130 and 140, respectively.

Possible choices for the values of n, m, $\omega_{s1}$, and $\omega_{s2}$ can be summarized as follows. The first case is where n=m and where $\omega_{s1}$=$\omega_{s2}$. In this case $\Delta\omega$=0, and the amplitude of the coherent term $I_{ac}$ simplifies to $2\vec{E}_1 \cdot \vec{E}_2 \cos(\phi)$, which will be static or quasi-static depending upon the time behavior of the relative phase $\phi$. If the path lengths of beams 130 and 140 are equal and not changing significantly, then $\phi$ will be determined by the relative phase of the AOM sound fields, which is set by the RF phase driving AOMs 150 and 160. By controlling the relative RF phase applied to AOMs 150 and 160, the level of coherent crosstalk can be controlled, and ideally, nulled to zero. For example, a calibration procedure could be used in which the path intensity of beam 192 after PBSC 190 is measured with beam 140 turned on, and compared with the intensity of beam 192 after PBSC 190 with beam 140 turned off. The relative phase of the AOM RF signals may be simultaneously adjusted during these comparative measurements until the phase difference between beam 194 in its ON and OFF states is minimized (effectively setting $\phi=\pm\pi/2$). The relative phase may also be adjusted by increasing the optical path-length difference of one of the beam paths, e.g. 192, in relation to the other beam path, e.g. 194, before beam crossover location 174, as will be discussed with reference to FIGS. 4-7.

The second case is where n=m and where $\omega_{s1} \neq \omega_{s2}$. By driving the AOM sound fields at different frequencies, the crosstalk term appears at the difference frequency, given by $\Delta\omega = \omega_{s1} - \omega_{s2}$. Accordingly, $\Delta\omega$ can readily be controlled and set anywhere in the range from 0 Hz to over $10^6$ Hz. This would be especially useful where a calibration procedure averages beam energy over a certain time window T. If $\Delta\omega \gg 1/T$, then the variations resulting from coherent crosstalk are effectively averaged.

The third case is where $n \neq m$ and where $\omega_{s1} = \omega_{s2}$. By aligning AOMs 150 and 160 to operate on different diffractive orders, the crosstalk term appears at the difference frequency, given by $\Delta\omega = (n-m)\omega_{s1}$. For example, if n=+1 and m=−1, $\Delta\omega = 2\omega_{s1}$. This advantageously yields a relatively high crosstalk frequency while utilizing one RF oscillator to drive both AOMs 150 and 160, which crosstalk frequency is outside the nominal passbands of the two laser processing beams. For example, with $\omega_{s1} = \omega_{s2} = 10^8$ radian/s and n=+1 and m=−1, we have $\Delta\omega = 2 \times 10^8$ radian/s. Thus, $\Delta\omega$ is significantly higher than other values of $\Delta\omega$ available by using the second case above, making it easier to move the crosstalk frequency farther outside the passband frequencies of the two laser processing beams.

Figure 4:
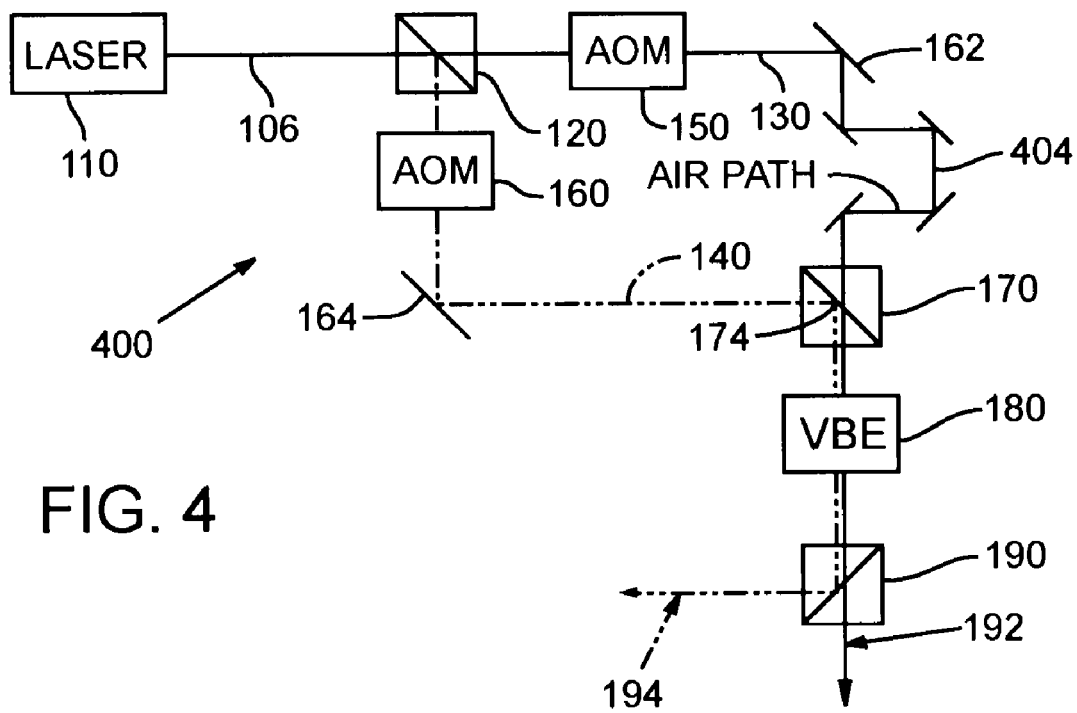
FIG. 4 displays a dual-beam laser processing system such as that of FIG. 1, but with an air path of a given length for a first beam before combination with a second beam by a polarizing beam splitting cube.
Figure 5:
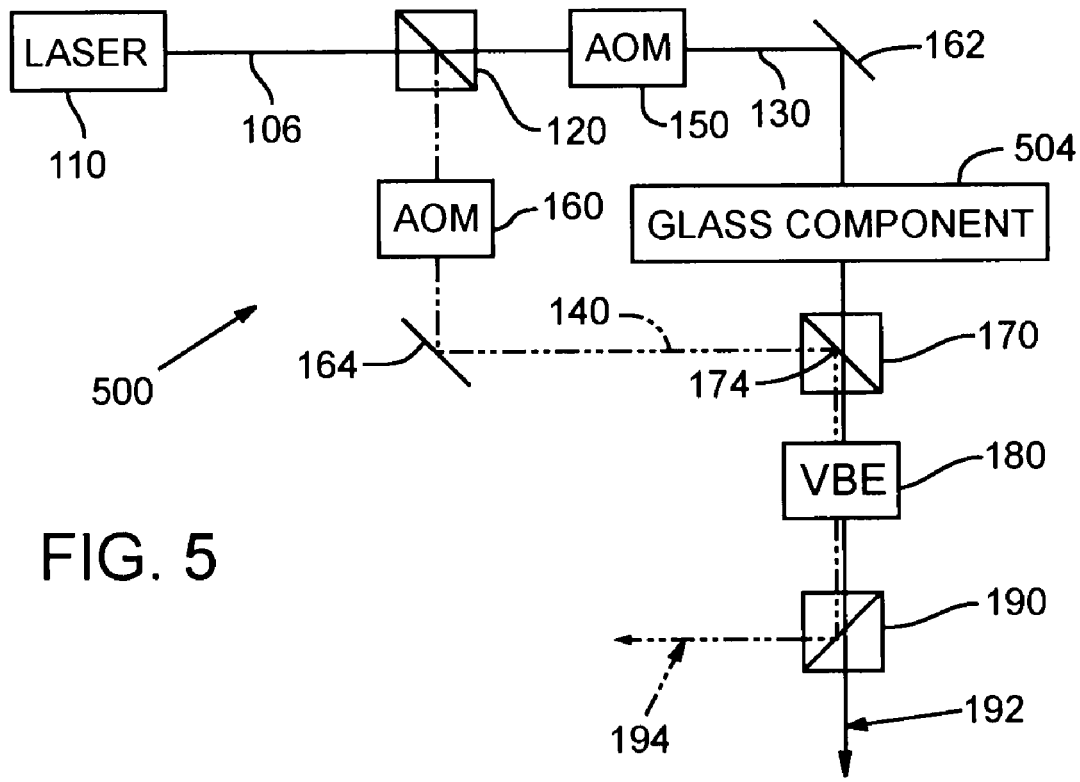
FIG. 5 displays a dual-beam laser processing system such as that of FIG. 1, but with an optical path of a given length imparted by a glass component to a first beam before combination with a second beam by a polarizing beam splitting cube.

FIG. 4 displays a dual-beam processing system 400, similar to system 100 of FIG. 1, but constructed with an air path 404 of a given length for first beam 130 before combination with second beam 140 by second PBSC 170. FIG. 5 displays a dual-beam laser processing system 500, similar to system 100 of FIG. 1, but with an optical path of a given length imparted by a glass (or optical refractor) component 504 to first beam 130 before combination with second beam 140 by second PBSC 170.

In either FIG. 4 or FIG. 5, the effect of introducing air path 404 or glass component 504 is to add a path-length difference between the beam paths of beams 130 and 140, prior to beam recombination at PBSC 170. The path-length difference is greater than the coherence length (Lc) of laser 110, but not so long as to cause unacceptable differences in beam propagation. Thus, the path-length difference may be incremental and still have its desired effect. This has the added effect of reducing the mutual temporal coherence between one or both pairs of beams 192m and 194l and beams 194m and 192l, and thereby reducing the crosstalk resulting from coherent addition of the two components of each of the beam pairs. The coherence length (Lc) is the optical path-length difference of a self-interfering laser beam that corresponds to a 50% fringe visibility, where the fringe visibility is defined as $V = (I_{max} - I_{min})/(I_{max} + I_{min})$ and $I_{max}$ and $I_{min}$ are the respective maximum and minimum fringe intensities.

The optical path-length difference can be introduced as air path 404 in one of the beam paths of beams 130 and 140, as shown in FIG. 4, or by placing a refractive optical element, such as a piece of optical glass 504 of thickness d and refractive index n, in one of the beam paths of beams 130 and 140. Optical glass 504 introduces a change in optical path-length (n−1)d, as shown in FIG. 5.

When two beams of equal temporal frequencies ($\Delta\omega=0$) and of intensities $I_1$ and $I_2$ overlap, the resultant total intensity I includes, in addition to the simple sum ($I_1+I_2$), a coherent addition or interference term $$I_{ac} = 2\vec{E}_1 \cdot \vec{E}_2 \cos(\phi(t)),$$

where $\vec{E}_1$ and $\vec{E}_2$ are the electric field amplitude vectors for the beam and $\phi(t)$ is a phase term that arises from path-length differences and coherence properties of beams 130 and 140. One condition for maximum crosstalk is that both beams 130 and 140 travel equal path lengths from the laser to beam overlap location 174. Under this condition, the phase term $\phi(t)$ is a relatively slowly changing function of time as small path-length difference changes occur (on the order of the wavelength of laser 110) resulting from mechanical vibration and thermal effects. That beams 130 and 140 travel equal path lengths to beam overlap location 174 may be desirable for purposes of having highly similar beam propagation characteristics such as spot size, beam divergence, and waist location. Therefore, when adding a path-length difference between beams 130 and 140, one may limit the difference to prevent large divergences in spot size, beam divergence, and waist location.

Because of the vector dot product of the electric fields $\vec{E}_1$ and $\vec{E}_2$, only the polarization component common to both beams 130 and 140 contributes to the crosstalk term $I_{ac}$. To the extent that the crosstalk term $I_{ac}$ cannot be eliminated through use of orthogonal polarizations, its effect on coherent crosstalk may be reduced by purposefully introducing an optical path-length difference in one of beams 130 and 140 upstream from the beam overlap location 174. This air path introduces a time delay between beams 130 and 140 which, if larger than the coherence time of the laser source, results in reduced coherent crosstalk. (Physically, the phase factor $\phi(t)$ in the coherent addition undergoes very rapid and random fluctuations between 0 and $2\pi$ as the path-length is increased beyond the coherence length of the laser, with the result that the $\cos(\phi(t))$ term averages to zero over time periods of interest as determined by the passbands of power measurement/calibration subsystems 196 and 198.) The increase in optical path-length may be accomplished by adding or subtracting an air path 404, or by inserting a transmitting optical material 504 with n>1, such as glass, in one of the beam paths of beams 130 and 140. The required delay time is of the order of approximately $1/\Delta v$, where $\Delta v$ is the bandwidth of the laser. The delay time t is related to the optical path-length difference I by I=ct, where c=speed of light.

Figure 6:
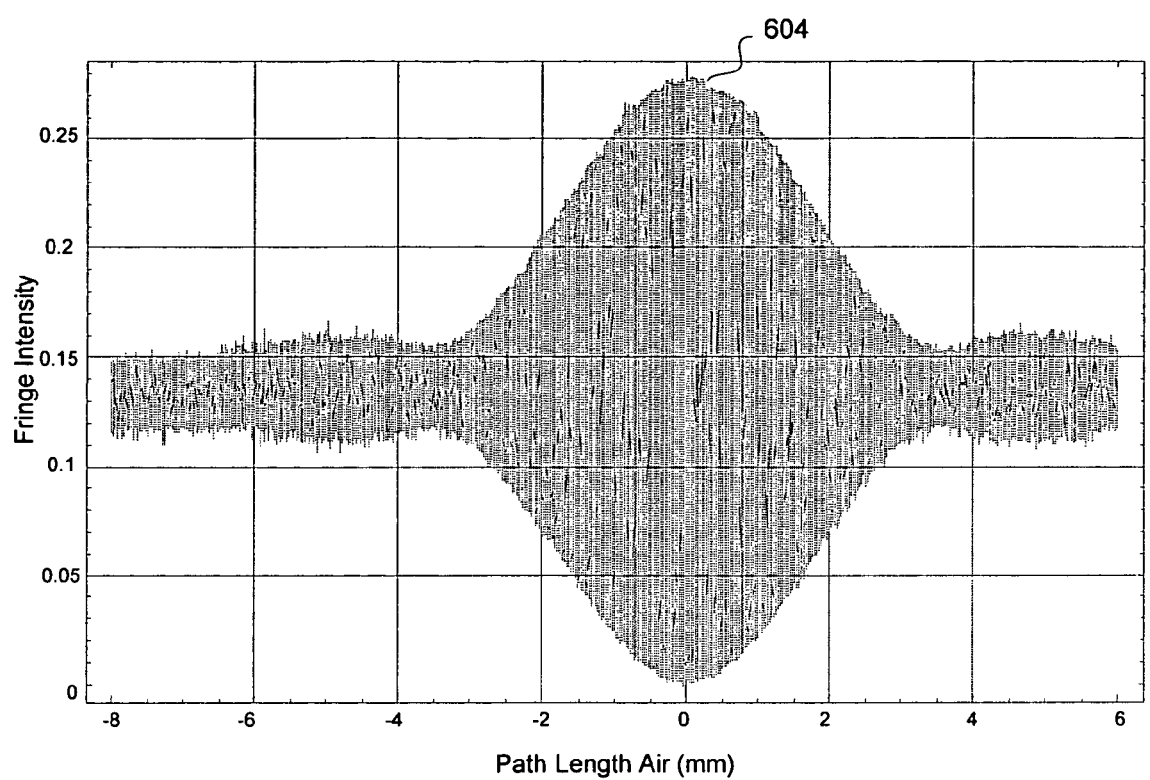
FIG. 6 is a graph of coherence length versus fringe (or coherence crosstalk) intensity for a 1343 nm pulsed laser measured using a Michelson interferometer that splits a laser into two optical paths and recombines them into a common path.

FIG. 6 is a graph showing an example of the coherence length of a 1343 nm pulsed laser as measured using a Michelson interferometer, which splits a laser into two optical paths and then recombines them into a common path where the total beam intensity I can be measured using a detector. The horizontal axis represents the change in air path-length in millimeters, and the vertical axis represents the fringe (or coherent crosstalk) intensity $I_{ac}$, as indicated by a signal envelope 604, which is a direct measure of the temporal coherence of laser 110 for a given path-length difference. FIG. 6 indicates that the coherent crosstalk is most intense where beams 130 and 140, and thus processing beams 192 and 194, are substantially exactly coherent (i.e., equal path lengths) and that signal envelope 604 decreases by approximately a factor of 10 for an air path-length difference of +3.5 mm. By introducing this modest path-length difference, system 400 may achieve a marked reduction in coherent crosstalk.

Figure 7A:
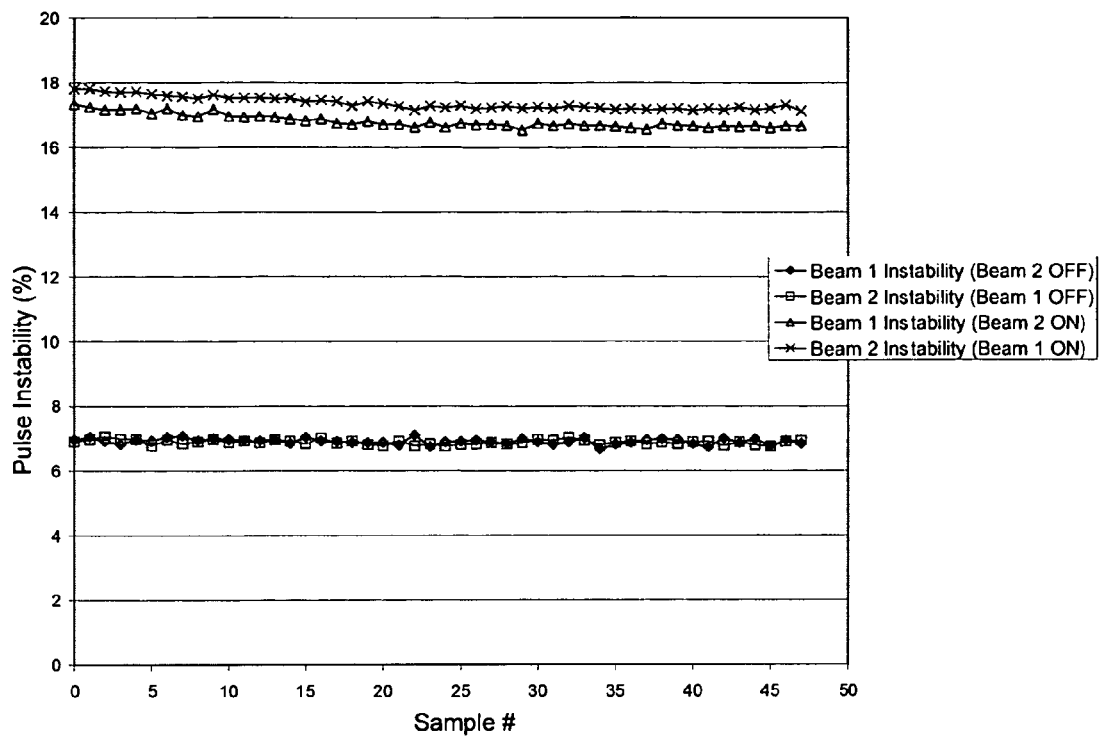
FIGS. 7A and 7B are charts indicating the reduction in crosstalk achievable by introducing a path-length difference in a dual-beam laser system.
Figure 7B:
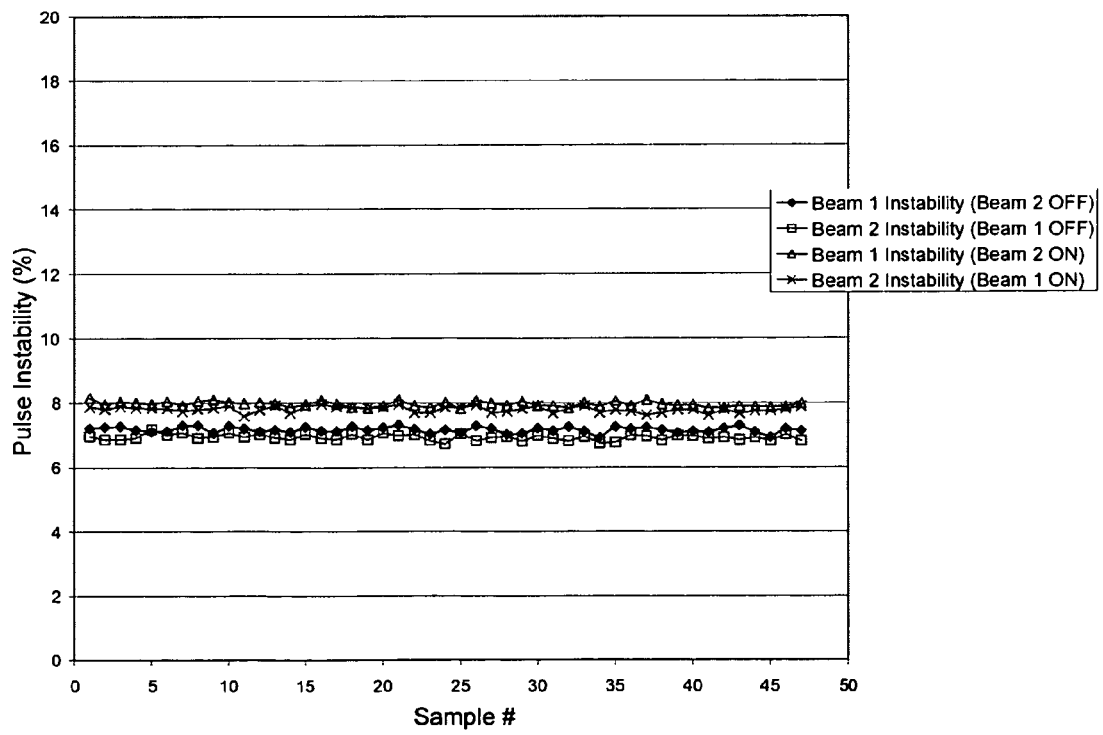

FIGS. 7A and 7B are charts showing the reduction in coherent crosstalk achievable by introducing a path-length difference in a dual-beam laser system. The horizontal axis represents an increasing number of samples, on a scale of 10,000 samples per point, taken during a test of the coherent crosstalk present in laser processing beams. The vertical axis represents the measured pulse instability at each sample point. The chart of FIG. 7A shows measured pulse stability for equal path lengths, with the upper pair of data points representing processing laser beams 192 and 194 that are relatively unstable when both beams 130 and 140 are in their ON states (coherent crosstalk present) versus the lower pair of data points showing greater stability in processing beams 192 and 194 when only one of beams 130 and 140 is in its ON state (no coherent crosstalk possible).

The chart of FIG. 7B shows the same data for a system configuration in which 10 mm of fused silica glass (n=1.46) is introduced into one of the beam paths of beams 130 and 140 with a 4.6 mm path-length difference, showing a substantial reduction in coherent crosstalk.

While specific embodiments and applications of the present disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the present disclosure disclosed herein without departing from the spirit and scope of the present disclosure.

The invention claimed is:

1. A method of forming two laser processing beams with controlled stability at a work surface of a target specimen, comprising:
   providing first and second mutually coherent laser beams propagating along separate first and second beam paths;
   combining the first and second mutually coherent laser beams in a common beam path portion of an optical component train to perform an optical property adjustment that is common to the first and second laser beams;
   separating the first and second previously combined laser beams into third and fourth laser beams that propagate along respective third and fourth beam paths, one of the third and fourth laser beams contributing a leakage component that copropagates in mutual temporal coherence with the other of the third and fourth laser beams; and
   reducing an effect of the mutual temporal coherence of the leakage component and the other of the third and fourth laser beams with which the leakage component copropagates to deliver for concurrent incidence on the target specimen stabilized first and second processing beams corresponding to the third and fourth beams.

2. The method of claim 1, in which the reducing of an effect of the mutual temporal coherence comprises setting an optical path-length difference in the separate beam paths of the first and second mutually coherent laser beams before the combining of them in a common beam path portion, the optical path-length difference being of an amount that reduces the mutual temporal coherence of the leakage component and the other of the third and fourth laser beams with which the leakage component copropagates and thereby the effect of the mutual temporal coherence on the stability of the first and second processing beams.

3. The method of claim 2, in which the first and second mutually coherent laser beams have a coherence length, and in which the optical path-length difference is greater than the coherence length.

4. The method of claim 2, in which the optical path-length difference is accomplished by introducing an incremental change in an air path length in one of the separate first and second beam paths.

5. The method of claim 2, in which the optical path-length difference is accomplished by positioning a refractive optical element having a thickness, d, and a refractive index, n, in one of the separate first and second beam paths to introduce an optical path-length change that equals $(n-1)d$.

6. The method of claim 1, in which the optical property adjustment comprises beam width expansion.

7. The method of claim 1, in which the leakage component is characterized by a frequency, and further comprising:
   frequency shifting one of the first and second mutually coherent beams and thereby frequency shifting the leakage component of one of the third and fourth laser beams at a frequency that reduces the effect of the mutual temporal coherence of the leakage component and the other of the third and fourth laser beam on the stability of the first and second processing beams.

8. The method of claim 7, in which the leakage component corresponds to a coherent crosstalk frequency, $\Delta\omega$, in which the first and second processing beams operate in respective first and second nominal passbands, and in which a modulation device positioned in the beam path of the one of the first and second mutually coherent laser beams performs the frequency shifting, the modulation device characterized by a signal property that imparts to the leakage component a value of frequency such that the coherent crosstalk frequency, $\Delta\omega$, is outside of a corresponding one of the first and second nominal passbands.

9. The method of claim 8, in which the modulation device comprises an acousto-optic modulator.

10. The method of claim 9, in which the acousto-optic modulator imparts the frequency value by adjusting a phase difference between the first and second mutually coherent laser beams.

11. The method of claim 1, in which the first and second mutually coherent laser beams are pulsed laser beams.

12. The method of claim 1, in which the leakage is characterized by a frequency, the method further comprising:
   frequency shifting the first and second mutually coherent beams at respective first and second frequencies and thereby frequency shifting the leakage component of one of the third and fourth laser beams, which frequency shifting reduces the effect of the mutual temporal coherence of the leakage component and the other of the third and fourth laser beams on the stability of the first and second processing beams.

13. The method of claim 12, in which the leakage component corresponds to a coherent crosstalk frequency, $\Delta\omega$, in which the first and second processing beams operate in respective first and second nominal passbands, and in which first and second modulation devices positioned in, respectively, the first and second beam paths perform the frequency shifting, the first and second modulation devices characterized by a signal property that imparts to the leakage component a value of the frequency such that the coherent crosstalk frequency, $\Delta\omega$, is outside of the first and second nominal passbands.

14. The method of claim 13, in which the first and second modulation devices comprise respective first and second acousto-optic modulators.

15. The method of claim 14, in which the first and second acousto-optic modulators impart the frequency value by driving, respectively, the first and second mutually coherent laser beams at different frequencies.

16. The method of claim 14, in which the first and second acousto-optic modulators impart the frequency value through different diffractive orders of the respective first and second acousto-optic modulators.

17. The method of claim 16, in which the first and second acousto-optic modulators impart the frequency value by driving, respectively, the first and second mutually coherent laser beams at the same frequency.

* * * * *